June 27, 1944.  J. D. PALMER  2,352,493
ILLUMINATED AUTOMOBILE ASHTRAY
Filed June 17, 1943
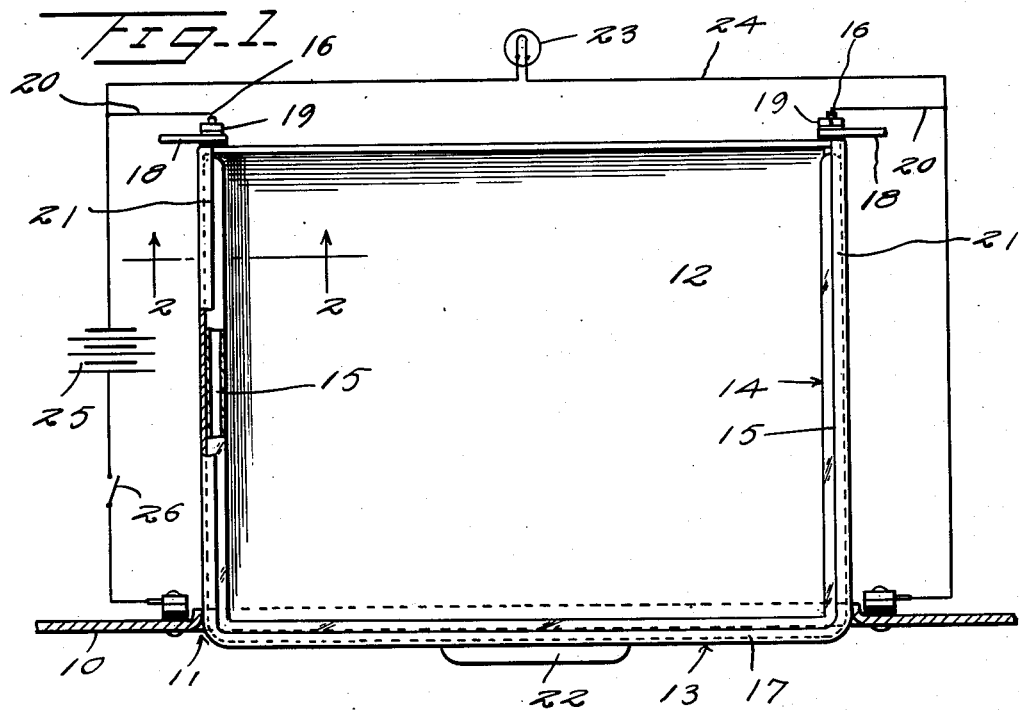
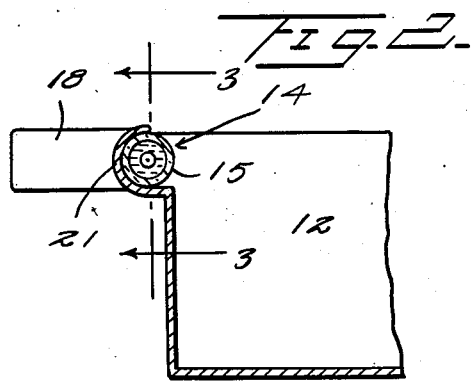
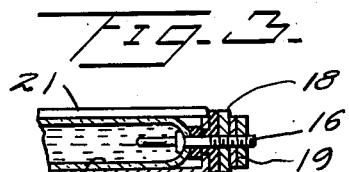
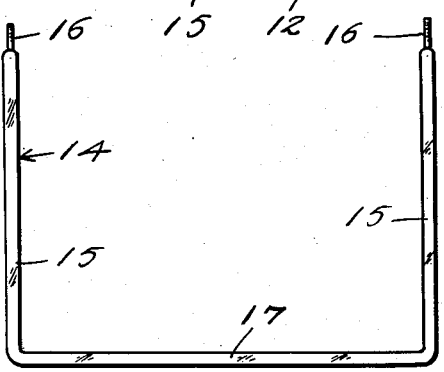
Inventor
J. D. Palmer
By L. F. Randolph
Attorney Patented June 27, 1944

2,352,493

UNITED STATES PATENT OFFICE 2,352,493

ILLUMINATED AUTOMOBILE ASH TRAY

James D. Palmer, Monmouth, Ill.

Application June 17, 1943, Serial No. 491,173

4 Claims. (Cl. 240—2)

This invention relates to an ashtray for automobiles of the type usually installed on the instrument panel, and it particularly aims to provide a means whereby the ashtray may be illuminated as desired, especially at night, in order to avoid the burning of holes in the upholstery of the automobile, marring of the finish of parts of the automobile, burning of the clothing or the like incidental to smoking.

I further aim to provide a construction wherein the illumination is under control of any light switch of the automobile.

Further, it is aimed to provide a structure wherein the bulb or envelope means of the light or lamp will function dually as the illuminating means and as the guide or mounting for the tray.

The more specific objects and advantages will become apparent from a consideration of the description following taken in connection with the accompanying drawing illustrating an operative embodiment.

In said drawing:

Figure 1 is a plan view showing the invention in electrical diagram and in connection with fragments of an automobile shown in section;

Figure 2 is a cross-section taken on the line 2—2 of Figure 1;

Figure 3 is a detail section taken on the line 3—3 of Figure 2; and

Figure 4 is a plan view of the lamp or bulb detached.

Referring specifically to the drawing wherein like reference characters designate like or similar parts, an instrument panel of an automobile has been shown by way of example at 10, having an opening 11 therethrough into and out of which an ashtray 12 is adapted for slidable movement, such ashtray being extremely light in weight and having its front wall at 13 forming a closure for the opening 11 when it is in closed position.

In carrying out my invention I utilize an electric lamp bulb 14 which may be of generally U-shape as shown, having parallel arms 15. This lamp for instance may be of the neon or other gas-filled type although it may be an ordinary incandescent lamp of suitable capacity if preferred. At the ends of the bulb 15 the usual terminals 16 are provided.

The lamp or bulb 14 is mounted horizontally in a plane adjacent the top of the opening 11, with the bridge portion 17 of the lamp disposed approximately in such opening 11. Said terminals 16 are removably engaged in and insulated from brackets or supports 18 suitably secured to the dashboard or other part of the automobile behind the panel 10. In the rear of the brackets 18 one or more nuts 19 are provided on each terminal to connect conductors 20 to the terminals.

It will be noted that at the two sides and front the walls of the receptacle 12, at the tops, are curled or semi-circular as at 21 to provide channels, whereby such tray 12 is slidably mounted on the bulb, particularly the parallel arms 15, to enable the same to be pulled in and out of the opening 11 for use. A finger grip 22 is preferably provided on the front wall of the tray.

Said bulb 14 may be included in any lighting circuit on the automobile, for instance the circuit for the headlights, the circuit for the dimmer, or otherwise. As shown, one representative light is indicated at 23 in an electric circuit 24 including the battery 25 and a switch 26. This circuit may be grounded to the frame of the automobile, as at the dashboard 10, and the conductors 20 may lead from the circuit 24.

As a result of the construction described the lamp 14 functions dually as a lighting medium for the tray and surrounding parts, and in addition will serve as the support or mounting means for such tray. The bulb 14 may be included in the lighting system universal or particular to any car, so that it will be illuminated each time the light switch operates, or whenever the light switch is in "on" position, whether it is switching on headlights, parking lights, dimmers, or otherwise.

Various changes may be resorted to provided that they fall within the spirt and scope of the invention.

I claim as my invention:

1. In combination with an instrument panel, said panel having an opening, an ashtray movable in said opening, and elongated electric lamp bulb means functioning dually to mount directly and slidably and illuminate said ashtray and means on the ashtray engaging the first-mentioned means.

2. In combination with an instrument panel, said panel having an opening, an ashtray movable in said opening, and means operable dually to mount slidably and illuminate said ashtray, consisting of an elongated electric lamp bulb, said tray having channel means directly and slidably engaging the bulb.

3. In combination with an instrument panel, said panel having an opening, an ashtray movable in said opening, and means operable dually to mount slidably and illuminate said ashtray, consisting of an elongated electric lamp bulb, said tray having channel means directly and slidably engaging the bulb, at parallel portions on opposite sides of the tray.

4. In combination with an instrument panel, said panel having an opening, an ashtray movable in said opening, and means operable dually to mount slidably and illuminate said ashtray, consisting of an elongated electric lamp bulb, said tray having channel means directly and slidably engaging the bulb, at parallel portions on opposite sides of the tray, and across the front of the tray.

JAMES D. PALMER.